Nov. 7, 1961
C. R. CARPENTER
3,008,046
METHOD OF AND APPARATUS FOR MAKING A GEOPHYSICAL
AND TOPOGRAPHICAL MAP
Filed Dec. 17, 1957
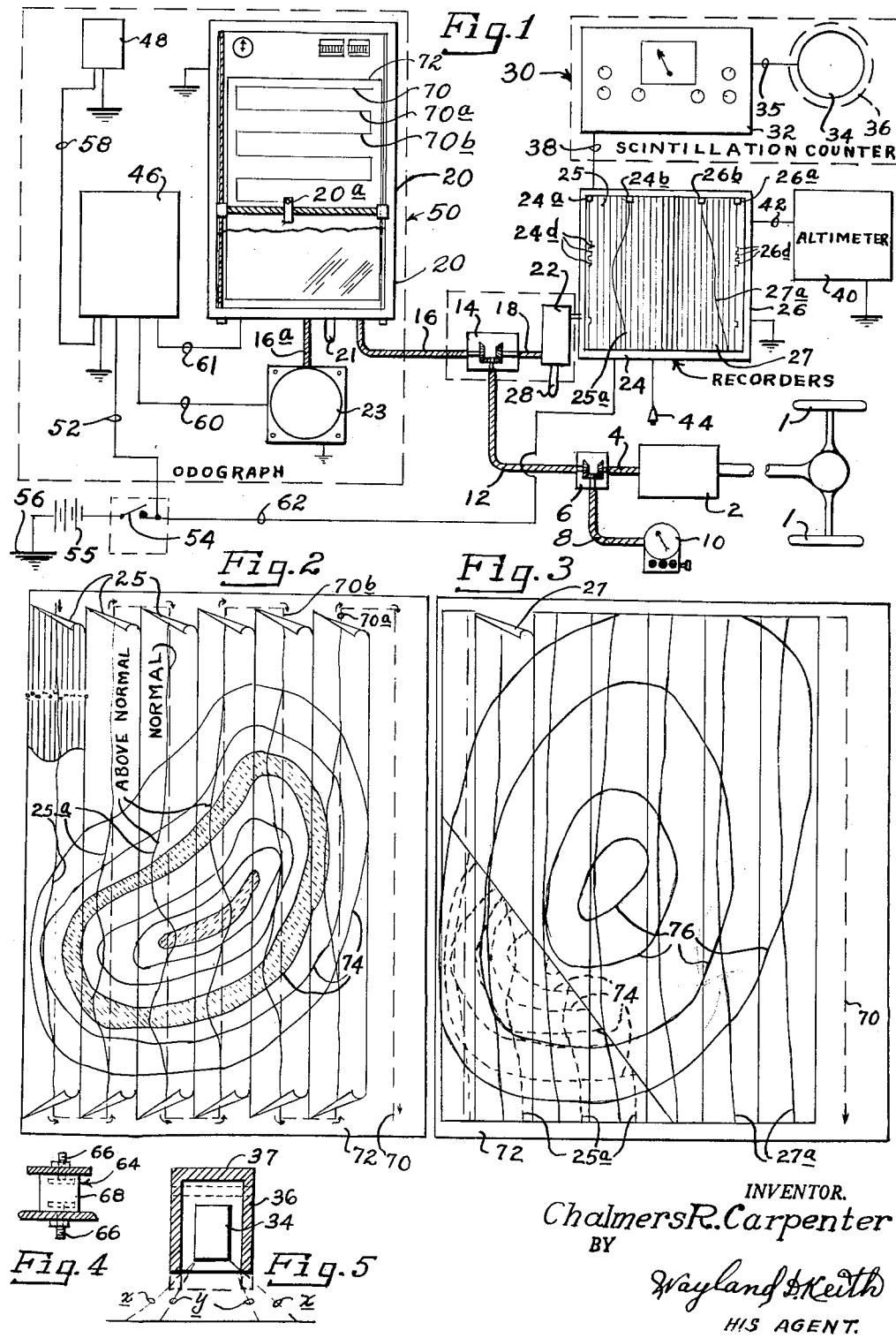
INVENTOR.
Chalmers R. Carpenter
BY
Wayland D. Keith
HIS AGENT.

United States Patent Office 3,008,046
Patented Nov. 7, 1961

3,008,046
METHOD OF AND APPARATUS FOR MAKING A GEOPHYSICAL AND TOPOGRAPHICAL MAP
Chalmers Robert Carpenter, 2406 Talumar Lane, Wichita Falls, Tex.
Filed Dec. 17, 1957, Ser. No. 703,297
10 Claims. (Cl. 250—71.5)

This invention relates to improvements in a combination odograph, scintillation counter-recorder, and an altimeter-recorder, which instrument, together with other component elements, connect in geared, timed, synchronized relation to the wheel of a vehicle in such manner that the gamma radiation, and the elevation above sea level can be simultaneously recorded in a coordinated relation to the linear distance traveled, in exact linear relation to, or in proportionate relation to the map being made simultaneously by an odograph, whereby the information may be integrated into a single, composite map, immediately upon the completion of the survey, without the necessity of redrawing the map and locating the various radiation highs and lows, as well as the elevational highs and lows.

Various instruments have been proposed heretofore, to perform these individual functions, however, the present device enables the entire mapping and recording to be performed speedily and without the usual delay encountered between the completion of the survey and the making of the map, which usually had to be done by skilled geologists and draftsmen.

An object of this invention is to provide an instrument which is mounted on a vehicle, such as an automobile, pushcart, or the like, which instrument will automatically map the area traversed, with respect to the area covered, the direction of travel of the vehicle, and simultaneously, recording the gamma radiation of the area traversed and the altitude of the area traversed, on a rectilinear recording strip or strips, to a scale, so that the record strip or strips made by the rectilinear recorder may be appliqued to the map, which has been simultaneously made, with the record strips, in such manner that both the gamma radiation intensity and the altitude can be correlated individually and comparatively, immediately upon completion of the survey.

Another object of the invention is to provide a combination odograph, gamma radiation recorder, and altimeter recorder instrument, wherein a map is made to scale, as a tape or strip of material is moved through a rectilinear recorder, so as to record the gamma radiation and the altitude over the area traversed, in direct proportion to the distance traversed by the vehicle, so that the record strip or strips may be appliqued onto a base map, which base map may be enlarged or reduced in scale to that of the rectilinear tape or strip on which the gamma radiations and altitudes have been recorded.

A still further object of the invention is to provide an event or identifying marker, whereby certain landmarks traversed may be recorded on the graph strips and used to identify corresponding locations on the map.

Another object of the invention is to provide a combination map making and information recording instrument, which is shock insulated in such manner as to cushion the sensitive instruments against marked deviation due to rough terrain.

Still another object of the invention is to provide a mobile instrument wherein the scintillation counter crystal is so shielded as to give readings in an area immediately adjacent the vehicle, thereby enabling the gamma radiation and isorad map, that is a map of equal radiation intensities, to be made so that the correlation will be readily apparent to those skilled in the art.

With these objects in mind, and others which will become apparent as the description proceeds, reference is to be had to the accompanying drawings, in which like reference characters designate like parts in the several views thereof, in which:

FIG. 1 represents diagrammatically the composite combination of an odograph scintillation counter and altimeter, which are connected together in coordinated relation with a rectilinear recorder, which recorder graphically records, on a strip, the gamma radiation intensity and the altitude, on the same scale or on a proportionate scale to that of a map made by the linear travel of a vehicle;

FIG. 2 is a plan view showing a map made by an odograph showing portions of the rectilinear strips on which the gamma ray radiation intensity has been recorded, which strips have been appliqued onto the map of the same scale, so as to enable the determination of gamma radiation highs and lows, which map may be contoured and shaded to give an isorad map to show the highs and lows immediately upon completion of the traversing operation;

FIG. 3 shows a map similar to that shown in FIG. 2, but showing altitude graph lines made by the altimeter recorder, and showing topographical contours based upon altitude recordings, and showing, on a small corner of the map, in dotted outline, how the gamma radiation has been recorded simultaneously with the altitude recordings, on the same strip, and showing contours in dotted outline on the same portion of the map, so as to enable both readings to be made simultaneously from a single map;

FIG. 4 is a view of a typical shock insulating mounting for the instruments; and FIG. 5 is a diagrammatic view of a shield for insulating the scintillation counter crystal from radiation exposure from areas other than the area being explored.

With more detailed reference to the drawing, the device, as shown in FIG. 1, is connected in geared relation to ground engaging wheels 1 of a vehicle. The wheels 1 are connected in geared relation to a transmission 2, such as the transmission of an automobile, truck or the like. A flexible shaft drive 4 connects with the transmission 2 and drives through a geared T-connection 6 from which two flexible cables drive. One of the flexible drive cables 8, which extends outward from T-connection 6, may drive a speedometer or odometer, such as indicated at 10. The other branch of the flexible drive cable, as indicated at 12, interconnects between geared T-connection 6 and a second geared T-connection 14, from which T-connection 14, flexible cables 16 and 18 extend. The flexible drive cable 16 extends to the plotting unit 20 of the odograph which is designated generally at 50, and which is substantially of conventional form, as is illustrated and described in Patent No. 2,533,029, issued to Alvin G. McNish and Bryant Tuckerman, Dec. 5, 1950, and the construction and operation of which odograph is described more in detail in the War Department Manuals TM5-9400, dated March 15, 1944, and TM5-9411, dated September 16, 1943, which manuals give detailed instructions relative to the odograph. The inventor does not claim to have invented any of the elements shown and described in the above mentioned patent or manuals, but refers to the above, in the absence of a complete mechanical showing, as to the construction and operation of the present instrument.

The flexible drive cable 18, of the present device, connects to a gear reduction mechanism 22, which gear reduction mechanism is, in turn, connected to the drive mechanism of a gamma radiation recorder 24 and an altimeter recorder 26. The recorders are preferably made as an integral unit, to graphically record the gamma radiation and the altitude of the path being traversed by the vehicle, simultaneously on a single, relatively narrow strip as it passes therethrough, which strip has reference lines printed thereon to enable instant reading of both altitude and the gamma radiation, which enables contouring relative gamma radiation intensity and relative high and low altitudes directly from the information recorded.

A gear shift lever 28 is provided intermediate the transmission 2 and the recorders 24 and 26, so as to enable the changing of gears, so the recorder tape 25 may be driven in various ratios of speed with respect to the travel of the wheels 1 of the vehicle over the terrain. Likewise, the plotting unit 20 of the odograph has a gear shift lever arrangement, as indicated at 21, to enable the changing of the ratio of the traversing elements, so that the stylus or pen 20a thereof will move in exact scaled relation with respect to the lineal distance traversed by the wheels 1 of the vehicle.

A magnetic compass, as indicated at 23, is connected by a flexible drive cable 16a in coordinated driving relation with the plotting unit 20 of the odograph, so that the compass will cause the stylus or pen 20a of the odograph to move in the correct direction, plus or minus the error factor necessitated by the particular construction of the instrument.

The numeral 30 designates generally a scintillation counter unit, which comprises a scintillation counter 32 and a gamma radiation sensitive crystal 34, which crystal is connected thereto by a multi-conductor cable 35, in a manner well known for instruments of this character. The particular crystal, found to be best suited for this type of operation, is a seven inch crystal of sodium iodide, the top and sides of which are surrounded by a shield 36. The crystal 34 is placed at a suitable elevation, usually about five feet above the terrain being traversed, as on the top of a motor vehicle or the like. The shield 36 is usually made of lead, about one inch thick, in the form of a cylinder, with a closed top 37. The mounting of the crystal 34 atop a car or the like, is so it will be unobstructed with respect to the area being traversed. The scintillation counter is connected, through an electrical circuit, with recorder 24 by means of a cable, designated generally at 38, which cable is usually a two conductor cable, and the manner of connecting the counter and the recorder is well known in the art of electronics and of rectilinear graphic recorders.

An altimeter 40 is interconnected, by an electrical conductor cable 42, which is usually of the two conductor cable type, with rectilinear recorder 26, which, with the recorder 24, may be integrally connected in unitary driving relation, or a multiplicity of styluses or pen points may be used on a single recorder, to obtain graphic strip recordings of the gamma radiation data on strip 25 and the recording of the altitude on the strip 27, if separate recorders are used, or both recordings may be made on a single strip, as shown in the lower left hand portion of FIG. 3, so that these graphs will be lineally coordinated with the traversing path of the stylus 20a of the odograph. It is desirable to make the odograph map and the rectilinear strip or strips, recorded by the recorders 24 and 26, to the same exact scale, as this would enable the appliqueing of the strips, in side by side relation, directly to the map, in event the area is traversed by paralled, spaced apart, lineal paths, as indicated in FIGS. 1, 2 and 3. These paths can all be made in the same direction, from a common coordinated base line, or they can start from a point at one end of the area being traversed, or, in order to obviate the necessity of disengaging the odograph and the rectilinear recorders, and returning to base line to start each path to be traversed, the path may be as indicated in FIGS. 1, 2 and 3, whereby the odograph and the recorders may be disengaged, until the vehicle is in position to move in a path parallel to the previously run adjacent path, therefore, when the graphic strips are appliqued to the map, they will be arranged inversely, alternately from a common coordinated point at each end of the map. This point can be marked by an event marker 44, which is connected to the recorders 24 and 26, which event marker is a momentary contact switch, which causes second styluses or pens 24a and 26a, on the respective recorder strips, if separate recorder strips are used, to move laterally of the respective graph strips, as indicated at 24a and 26a, when the switch 44 is closed momentarily. It may be preferable, at this point, to disconnect the odograph and the recorders 25 and 27, until the vehicle is in position to start a path in reverse, parallel relation to the path just traversed by the vehicle.

While the recorder for the gamma radiation and the altimeter recorder have been described in some detail as to graphing separate strips, it is to be pointed out, that these graphic representations of the gamma radiation and the altitude, can be made on a single strip by a multiplicity of pens or styluses.

Although the method of making the map has been described in some particularly, as to the appliqueing of the graphic strips embodying the gamma radiation intensity and the altitude recordings onto a single map, it is to be understood that these may be made on a separate map, and if one or the other of the strips is of transparent material, and is appliqued to a transparent base sheet, the highs and lows of each of the maps may be correlated, and one map superposed on the other, so that the readings may be had simultaneously, or, when desired, the information from the record strips can be transferred to the odograph map and the contours made directly on the map sheet 72, or onto a transparent, acetate base film sheet or the like, to enable one map to overlie the other.

The plotting unit 20 of the odograph, the magnetic compass 23, the power pack unit 46, and a warning light 48 are combined into a composite odograph unit designated generally by the numeral 50. The electrical supply, such as electrical supply conductor 52, leads from one pole of switch 54 to the power pack unit 46, the current being supplied to the power pack unit 46 by a battery 55, which may have one side thereof grounded, as indicated at 56, if a grounded circuit is used.

The power pack unit 46 has a cable 58 extending between the warning light 48 and the unit 46, which cable usually has four conductors therein, which enables the proper signals to be transmitted therethrough. A cable 60 leads from the power pack unit 46 to an electronic magnetic compass 23. The cable 60 preferably has five conductors passing therethrough to the compass 23, to enable the proper electrical voltage and impulses to be transmitted thereto. The compass 23, which is described in detail, in the above mentioned patent and in the above mentioned manuals of the War Department, is of the electronic, "hunting type," that is, a beam of light is focused, so when light is reflected from one or the other of a pair of mirrors within the compass, an electronic tube is energized, which in turn, will move the compass in a coordinated relation with respect to the line of travel, so as to maintain a substantially magnetic north position, regardless of the direction the vehicle is traveling.

A mechanically actuated, flexible drive cable 16a extends between the plotting unit 20 of the odograph and the magnetic compass 23 and connects the plotting unit of the odograph and the compass 23 in geared relation, so that the odograph will draw a map, with respect to the magnetic pointings of the compass, as is brought out fully in the above mentioned patent and the above mentioned manuals. A multi-conductor cable 61, which usually has six conductors, extends between the plotting unit of the odograph and the power pack unit 46. In the present instance, the six conductors interconnect the two units so as to supply the correct voltage and circuits to the respective component parts of the plotting unit 20 of the odograph, to transmit the correct electrical impulses. An electrical conductor 62 extends between switch 54 and the recorders 24 and 26, so as to furnish the necessary electrical power to supply the recorders and the altimeter with electrical current. The tapes or record strips 25 and 27 on the respective recorders 24 and 26, are mechanically driven through a gear reduction mechanism 22 and flexible drive cable 18. However, it has been found desirable to maintain an electric motor and clutch arrangement within the recorders, so as to maintain the tapes 25 and 27 at the proper tension as they are being spooled. In some recorders it is desirable to use electrically boosted stylus actuators. Although the strips 25 and 27 have been shown to be in side by side relation, as separate record strips, it is to be pointed out that these may be made on a single composite strip, with the different recordings, preferably being made by ink of contrasting colors. It is preferable to make the recordings in contrasting colors, so that the gamma radiation chart profile may be readily distinguished from the altimeter chart profile.

The scintillation counter 32 has a two-conductor cable 38 leading from the scintillation counter to the rectilinear recorder 24. The altimeter 40 is connected to the rectilinear recorder 26 by a two conductor cable 42.

A typical shock absorbing element is illustrated at 64 in FIG. 4, which shock absorbing is preferably placed below, but in some instances both above and below, the respective units being shock insulated, and to the sides thereof, when conditions so indicate. With the various units so insulated, a minimum of vibration is transmitted thereto, and the instruments are so calibrated and compensated, as to operate under these conditions. The shock absorber unit, designated generally at 64, has a mounting member 66 on each end thereof, for attachment respectively to the instrument and to the base upon which the instrument rests. A resilient member 68 of elastomer material, is positioned between the mounting members 66 and the member to which they attach, so as to absorb shock and still maintain the instrument in a relatively stable position. The elastomer material of the member 68 may be a relatively dense sponge rubber, resilient plastic, or it may be an air cushioning member, to give the desired cushioning effect.

FIG. 5 illustrates diagrammatically, a sodium iodide crystal 34, which is so mounted as to receive a lead shield or cup 36 therearound and thereover. It is preferable to have a seven inch sodium iodide crystal from which a multi-conductor cable 35 leads. In the present instance, the cable 35 comprises nine conductors within a shielded armour, which comprises the tenth conductor, which cable 35 leads to the scintillation counter 32 for connection with the respective detection and amplifying units therein, so as to register the intensity of the gamma radiation. However, by having the shield 36 cup-shaped, that is, cylindrical with a cap 37 closing the upper end, the unwanted rays from above and from the sides of the sodium iodide crystal 34 are excluded from registering on the crystal. Therefore, by moving the lead shield from the position as shown in full outline in FIG. 5, to that shown in dashed outline therein, the effective area of radiation can be narrowed from a wide area cone, as defined by the lines $x$—$x$ to a narrow area cone, which is defined by the lines $y$—$y$. By so doing the area of radiation may be localized, to cover a relatively narrow path each time the vehicle traverses the area. In this manner, the area may be scanned minutely for gamma radiation, by the crystal 34 being passed thereover. However, by raising the shield 36, to the position shown in full outline, the cone $x$—$x$ will cover a wider area, which will permit the paths traversed over the area, by the vehicle, to be a greater distance apart, and while this arrangement will yield general information in a very short time, it does not "pinpoint" radiation so minutely as does the shielded pattern designated by the lines $y$—$y$.

*Operation*

With the odograph unit, designated generally at 50, ready for operation, that is, the odograph is adjusted to the plotting on the desired scale, and by placing a map sheet 72 on the device, and locating the stylus or pen 20a at a point commensurate with the particular location in the field of the area to be plotted by the plotting unit 20 of the odograph, and with the graph pens 24b and 26b positioned on the graph strips 25 and 27, respectively, and with the recorder set to record at the exact scale of the plotting unit of the odograph, or on a pre-planned proportionate scale, either larger or smaller, by shifting the gear shifting lever 28 into the proper gear, then by moving the vehicle along the terrain, to move the ground engaging wheels 1, and with the switch 54 closed so as to cause the energy from battery 55 to flow through the respective circuits to the respective electrically actuated, controlled, or energized instruments, the odograph will draw linear graph lines 70, in accordance with the path traversed by the vehicle, and if the path is linear for a predetermined distance, as shown on FIGS. 1, 2 and 3, to a point where it is necessary or desirable to make a return traverse, as indicated at 70a, 70b, the area may be traversed in a predetermined pattern, as by spaced apart, parallel paths, until the odograph map sheet 72 has the desired number of paths. If this particular pattern is used, the odograph, rectilinear recorders 24 and 26 and switch 54 may be disconnected at each end travel point, and reconnected when the vehicle is positioned to traverse another parallel path, such as indicated at 70a, 70b, etc. But, if it is not desired to disconnect the elements above mentioned, when a turn is made, a momentary contact switch 44 may be closed, which will cause secondary pens 24a and 26a to make blips 24d and 26d on the record strips at the exact point of turn, thereby enabling the strips to be correctly identified and appliqued onto the map sheet 72, when the plotting is completed. If desired, the blip sections of the strips may be cut out, and the scaled lengths of strips are appliqued to the map sheet 72 in coordinated relation with respect to the map lines 70, 70a, 70b, etc.

While the plotting has been described as being done in parallel, straight rows, it is not to be construed that the plotting must be done in this manner, it is usually an expedient manner of plotting, when the terrain permits. However, the area may be mapped diagonally or transversely, or by a combination of these or other movements may be used, so long as the map plotted by the odograph is in conformity with the path traversed. By pressing the event marker 44, identifying points may be marked on the recording strips, so that the strips may be cut and appliqued directly to the map plotted by the odograph, if both map and strips are made to the same scale. However, if, due to size restrictions of the plotting unit 20 of the odograph, the map made thereby may be plotted on one scale, then enlarged by the use of a pantograph, photographic methods, suitable for such work, or it may be drawn by hand to a scale to receive the record strips, and conversely, if the plotted map made by the odograph is on a larger scale, than the scale of the record strips, the graph record strips may be reduced photographically or otherwise, so as to enable the appliqueing of the strips of the same scale onto the sheet 72.

The map sheet 72, as shown in FIG. 2, shows the log strips of a radiation log, only, appliqued thereon, and shows contours of the highs and lows of the gamma radiation, so as to present useful data, to enable the evaluation of the radioactivity of the area traversed, whether it be uranium ore, oil, or other minerals, various minerals having various degrees of radioactivity.

In prospecting for oil, with a scintillation counter, it has been found that a peculiar gamma radiation phenomena is present in the area surrounding and overlying the oil bearing formation. Various theories have been offered to explain this phenomena, however it has been found that a radioactive high exists along the edge of the oil bearing formation, while normal or below normal radioactivity exists over the oil bearing formation, such as indicated in the isorad map, FIG. 2, which may be made by connecting points of substantially equal radiation intensity, certain areas or bands of contours may be shaded, as shown in FIG. 2, to enable immediate visualization of the extent and shape of the oil bearing formation.

FIG. 3 shows a composite map of a gamma radiation strip and an altimeter recording strip, which are made simultaneously, and to the same scale and in exact coordinated relation with the scale of the map made by the plotting unit 20 of the odograph, and by using contrasting colors for the graph lines 25a and 27a respectively of the gamma radiation graph and the altimeter graph, and using still a different color for the contour lines, as indicated at 74 and 76, the data from the map can be readily evaluated as to the overburden, topographical relation of the terrain with respect to the gamma radiation emitted from the terrain, thereby, upon one traversing of the area, the data obtained and recorded, may save many weeks of valuable engineering time. In this manner surveys may be made of an area, and the data graphically logged and mapped, thereby enabling deposits of ore, oil, gas and the like, to be outlined, thereby saving much valuable engineering time in locating oil pools and other mineral deposits, and such surveys also eliminate the expense of test drilling.

It is to be understood that the component parts of the scintillation unit 30 are well known in the art, as of the present time, and it is not considered necessary that it be described in detail herein, as the various elements and the manner of connecting the scintillation counter to a standard rectilinear recorder 24, is now common practice, as is the recording-altimeter, whether electrically connected to a standard recorder or made integral therewith, also it is thought to be immaterial whether the altimeter is electrically or mechanically connected to the pen 26b, which pen makes the graphic chart on the linear recording strip, as it is the finished record strip 27, in the case of the altimeter, and the finished strip 25, in the case of recording radiation that are important, as these strips made to the same scale as the plotted odograph map, makes possible the practice of the present invention.

It has been found, in actual field work with a scintillation counter, which has an absolute sensitivety of six million counts per minute in one milliroentgen field of gamma radiation, and with an instrument which is calibrated in a multiplicity of ranges, from zero to .005 and zero to .250, with four or more intermediate ranges, gives any range of gamma radiation detection and recording within the range of the respective settings. By having the unit mounted on a mobile vehicle, as much area can be traversed and accurately mapped, in one day, as would have taken several weeks, if manually operated instruments and hand drawn maps had been utilized.

Having thus described the invention, what is claimed as new and desired to secure by Letters Patent is:

1. A method of making a map of a terrain to show relative gamma radiation intensity thereof, comprising the steps of preparing a map, of passing a land vehicle over the terrain, of simultaneously feeding a lineal strip through a recorder in scaled relation to the path traversed by said land vehicle, of graphing the relative gamma radiation intensity of said traversed terrain in a coordinated, scaled relation on said strip, of transferring at least the controlling points of data of gamma radiation intensity onto said map on a proportionate scale, which map has at least the basic data determined by passing said land vehicle over said terrain.

2. A method of making a map of a terrain to show relative gamma radiation intensity thereof, comprising the steps of passing a vehicle over the terrain, simultaneously feeding a lineal strip through a recorder in exact scaled relation to the path traversed by said vehicle, of traversing subsequent paths in substantially side by side, aligned relation, of graphing the relative gamma radiation intensity on said strip in accordance with said traversed terrain in a coordinated, scaled relation, of preparing a map, of adjusting the scale of said map and said graph to unity, and of applying appropriate portions of said strip in side by side relation to said map in coordinated relation.

3. A method of mechanically making a map of a terrain to show relative gamma radiation intensity thereof, comprising the steps of passing a wheeled, land vehicle over said terrain and simultaneously of feeding a lineal strip through a recording instrument in scaled relation to the path traversed, of passing said vehicle over subsequent, spaced apart paths, which paths are in substantially aligned relation, of graphing the relative gamma radiation intensity on said strip in accordance with said traversed terrain in a coordinated, exact lineal scale, of preparing a sheet to receive portions of said strip of applying portions of said strip containing said graph thereon directly to said sheet in superposed, side by side, coordinated relation.

4. A method of mechanically making a map of a terrain to show composite, graphic data of relative gamma radiation intensity and the elevation with respect to given datum, comprising the steps of preparing a base map, of passing a wheeled, land vehicle over said terrain and simultaneously feeding a lineal strip through a recorder in scaled relation to the path traversed by said vehicle, of traversing subsequent paths in spaced apart, side by side, substantially aligned relation, of simultaneously graphically recording the relative gamma radiation intensity on said strip in accordance with said traversed terrain and the elevation on the surface of the earth with respect to sea level and with respect to said given datum of the traversed terrain, in coordinated scaled relation with respect to each other and with respect to said map, of adjusting the scale of said graphically recorded data and said map to unity and of applying portions of said strip in side by side, scaled relation containing said data obtained from said graphic recordings to said map.

5. A method of making a map of a terrain to show composite, graphic data of relative gamma radiation intensity and the elevation with respect to given datum, comprising the steps of preparing a base map of any scale, of passing a wheeled, land vehicle over said terrain and simultaneously feeding a lineal strip through a recorder in exact scaled relation to the path traversed by said vehicle, of traversing subsequent, spaced apart paths in substantially aligned relation, of simultaneously graphically recording the relative gamma radiation intensity on said strip in accordance with said traversed terrain and the elevation of the surface of the earth with respect to sea level and with respect to said given datum of said terrain traversed, in coordinated, scaled relation with respect to each other and with respect to said map, of adjusting the scale of said graphically recorded data and said map to unity, and of applying portions of said strip in side by side, scaled relation containing said graphically recorded data to said base map in superposed, coordinated relation.

6. The method as defined in claim 2, wherein said points of equal gamma radiation intensity in said paths are joined.

7. A method as defined in claim 4, wherein said points of equal gamma radiation intensity in said paths are joined, and wherein the points of equal elevation are joined.

8. In a geophysical instrument mounted on a land vehicle having a ground engaging wheel, an odograph connected in geared relation to said ground engaging wheel, a linear recorder connected in geared relation of said ground engaging wheel of said vehicle, a scintillation counter, said scintillation counter being operatively connected to said linear recorder, and a lineal recorder strip connected in geared relation with said recorder and in coordinated recording relation with said scintillation counter.

9. An instrument as defined in claim 8, wherein the geared relation between said odograph and said linear recorder may be selectively varied.

10. An instrument as defined in claim 8, and in addition thereto an altimeter, said altimeter being operatively connected to said linear recorder to record the elevation of the surface of the earth above sea level.

References Cited in the file of this patent

UNITED STATES PATENTS

| | | |
|---|---|---|
| 669,857 | Riebe | Mar. 12, 1901 |
| 830,718 | Holt | Sept. 11, 1906 |
| 1,342,793 | Costner | June 8, 1920 |
| 2,370,163 | Hare | Feb. 27, 1945 |
| 2,617,945 | Lord et al. | Nov. 11, 1952 |
| 2,656,471 | Herzog | Oct. 20, 1953 |
| 2,767,326 | Stratford | Oct. 16, 1956 |
| 2,879,663 | Thomas | Mar. 31, 1959 |
| 2,918,579 | Slobod et al. | Dec. 22, 1959 |